United States Patent
Verbitsky

(10) Patent No.: US 7,185,329 B1
(45) Date of Patent: Feb. 27, 2007

(54) USE OF DIFFERENT COLOR SEQUENCES FOR VARIABLES OF DIFFERENT SIZES AND DIFFERENT SEMANTICS

(75) Inventor: George Verbitsky, Mountain View, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 664 days.

(21) Appl. No.: 10/402,736

(22) Filed: Mar. 28, 2003

(51) Int. Cl.
*G06F 9/45* (2006.01)

(52) U.S. Cl. .................. 717/156; 717/144; 717/155

(58) Field of Classification Search ............ 717/100, 717/155–158, 144; 713/190; 716/1
See application file for complete search history.

(56) References Cited

U.S. PATENT DOCUMENTS

| | | | | |
|---|---|---|---|---|
| 4,571,678 A * | 2/1986 | Chaitin | ...................... | 717/156 |
| 4,656,582 A | 4/1987 | Chaitin et al. | ............... | 717/153 |
| 4,777,588 A | 10/1988 | Case et al. | ..................... | 712/41 |
| 4,782,444 A | 11/1988 | Munshi et al. | ............... | 717/153 |
| 5,249,295 A * | 9/1993 | Briggs et al. | ................ | 717/157 |
| 5,530,866 A * | 6/1996 | Koblenz et al. | ............ | 717/144 |
| 6,553,426 B2 | 4/2003 | Holzle et al. | ................ | 719/310 |
| 2004/0003385 A1* | 1/2004 | Kushlis | ...................... | 717/158 |

OTHER PUBLICATIONS

Nickerson, "Graph coloring register allocation for processors with multi-register Opernads", 1990 (pp. 40-52). [Online] [Retrieved at] <http://portal.acm.org/citation.cfm?id=93552>.*

Smith et al., "Graph-coloring register allocation for irregular architecture", 2001 (pp. 1-8). [Online] [Retrieved at] <http://citeseer.ist.psu.edu/smith01graphcoloring.html>.*

Briggs, "Register allocation via graph coloring", 1992 (pp. 1-52). [Online] [Retrieved at]<http://citeseer.ist.psu.edu/briggs92register.html>.*

Mogensen, "Register allocation for 8-bit processors?", 1995 (pp. 1-2). [Online] [Retrieved at] <http://compilers.iecc.com/comparch/article/95-03-057>.*

"Neighborhood-based Variable Ordering Heuristics for the Constraint Satisfaction Problem", Bessiere et al., 2001 (5 pages). [Online] [Retrieved at] <http://citeseer.ist.psu.edu/601090.html>.*

(Continued)

*Primary Examiner*—Tuan Dam
*Assistant Examiner*—Thuy Dao
(74) *Attorney, Agent, or Firm*—Silicon Valley Patent Group LLP; Omkar Suryadevara

(57) ABSTRACT

Colors to be used in register allocation are grouped into a number of sequences. Each sequence is associated with an attribute (e.g. size and/or type) of variables whose nodes in an interference graph can be colored by colors in the sequence. In certain embodiments, in addition to the above-described grouping, colors within a group are ordered in a sequence. The specific order that is used may depend on, for example, an attribute (such as size) and a predetermined preference. One example of such a predetermined preference is that a color that represents a register of the size that is associated with the sequence is located at the front of the sequence. Another color located later in the sequence represents a register of a different size than the size associated with the sequence.

9 Claims, 6 Drawing Sheets

OTHER PUBLICATIONS

"A Faster Optimal Register Allocator", Fu et al., IEEE Jan. 2002, pp. 245-256. [Online] [Retrieved at] <http://ieeexplore.ieee.org/xpls/abs_all.jsp?tp=&arnumber=1176254>.*

Entire File History of U.S. Appl. No. 10/402,663 filed on Mar. 28, 2003 by G. Verbitsky.

Boquist-Johnson, The GRIN Project: A Highly Optimizing Back End for Lazy Functional Languages, 1995, Chalmers University of Technology, Department of Computing Science, Goteborg, Sweden.

P. Briggs, K. D. Cooper, K. Kennedy, and L. Torczon, "Coloring Heuristics for Register Allocation", in Proceedings of the ACM SIGPLAN, Conference on Programming Language Design and Implementation, pp. 275-284, Portland, Oregon, Jul. 1989.

"Register Allocation", Chapter 16 of the book "Advanced Complier Design and Implemetation" by Steven S. Muchnick, published by Morgan Kaufmann, Academic Press 1997.

P. Briggs, K. Cooper, and L. Torczon, "Coloring Register Pairs," ACM Letters on Programming Languages and Systems, 1(1):3-13, Mar. 1992.

M. D. Smith, and G. Holloway, "Graph-Coloring Register Allocation for Architectures with Irregular Register Resources", Submitted to PLDI, 2002.

Timothy Kong, Kent D. Wilken, "Precise Register Allocation for Irregular Architectures," International Symposium on Microarchitecture, 1998.

Preston Briggs, Keith D. Cooper, Linda Torczon, "Improvements to Graph Coloring Register Allocation", ACM Transactions on Programming Languages and Systems, 1994.

* cited by examiner

USE OF DIFFERENT COLOR SEQUENCES FOR VARIABLES OF DIFFERENT SIZES AND DIFFERENT SEMANTICS

CROSS-REFERENCE TO COMPUTER PROGRAM LISTING APPENDIX

Appendix A contains the following files in one CD-ROM (of which two identical copies are attached hereto), and is a part of the present disclosure and is incorporated by reference herein in its entirety.

```
Volume in drive D is 030328_1014
Volume Serial Number is AB31-1178
Directory of D:\
03/26/2003    02:23p         13,883 CLRGRP.TXT
03/26/2003    02:23p          7,252 CLRIDENT.TXT
03/26/2003    10:06a        117,873 FUNC.TXT
03/26/2003    03:04p         34,770 INST.TXT
03/26/2003    01:52p         75,390 PARSER.TXT
03/26/2003    02:23p         57,505 REGALLOC.TXT
03/26/2003    10:07a         78,826 STMNT.TXT
              7 File(s)     385,499 bytes
              0 Dir(s)            0 bytes free
```

The files of Appendix A form source code of computer programs for an illustrative embodiment of the present invention.

The file PARSER.TXT contains a definition of the syntax of a high level language and software for a parser for the language. The file STMNT.TXT contains functions which operate on data structures that represent statements in the program being compiled. The file FUNC.TXT contains functions which operate on data structures that represent functions in the program being compiled. The file INST.TXT contains data structures for instructions.

The files CLRIDENT.TXT and CLRGRP.TXT are extracted from one or more of the above-described files, and respectively illustrate FIGS. 2B and 2C described below. Also, the file REGALLOC.TXT illustrates FIGS. 4A and 4B.

The attached software is written in object oriented Perl, version 5.6 and can be interpreted using an interpreter available from the Internet address obtained by replacing "=" with "." in the following: www=cpan=org. The attached software can be used with a workstation available from SUN MICROSYSTEMS, INC. running the UNIX™ or SOLARIS™ operating system. The software can be used for compiling programs written in a C-like language for execution on a network processor, such as nP7510 available from APPLIED MICRO CIRCUITS CORPORATION (AMCC) of San Diego, Calif. The assembler code generated by such compilation can be assembled using an assembler available from AMCC.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND

Program compilation is comprised of a number of steps one of which is register allocation for variables in the program. One popular allocation method uses graph coloring and was first described by Chaitin, e.g. in U.S. Pat. No. 4,571,678 that is incorporated by reference herein in its entirety. See also an article entitled "Register Allocation Via Coloring" by G. J. Chaitin et al. appearing in Computer Languages, Vol. 6, pages 47–57, Pergamon Press, Great Britain, 1981 that is incorporated by reference herein in its entirety.

Chaitin's allocator assumes that the software program can use an unlimited number of registers (also called "virtual registers"), constructs an interference graph that models conflicts between virtual registers. The vertices of the interference graph represent virtual registers, and edges connect virtual registers that cannot be assigned to the same real register.

After interference graph has been built, the interference graph's nodes are ordered, and then for each node in this order, a color is chosen from a list of k colors, where k represents the number of real registers in the computer. Each node is colored with a color different from the color of any node to which it is connected (also called "neighbor"). If such a k-coloring cannot be found, one or more values (in virtual registers) are spilled to memory, and the allocator repeats the entire process (but with spilled registers removed from among the virtual registers to be allocated).

In the case of irregular hardware architecture, where irregularity is in the fact that there are registers in which the most significant part and the least significant part can be referenced as separate hardware resources, Chaitin's allocator overspills e.g. spills virtual registers even in cases where real registers are available in the computer. Such overspillage may be reduced by adding extra edges or extra nodes. Use of extra edges is described by Preston Briggs, Keith D. Cooper and Linda Torczon in an article entitled "Coloring Register Pairs", ACM Letters on Programming Languages and Systems, 1(1):3–13, March 1992 that is incorporated by reference herein in its entirety. Use of extra nodes is described by B. Nickerson in an article entitled "Graph Coloring Register Allocation for Processors with Multi-Register Operands," Proc. SIGPLAN'90, Conf. on Programming Language Design and Implementation, pp 40–52, June 1990.

However, use of extra edges and/or extra nodes increases the complexity of the interference graph. Instead, weights may be assigned to nodes in the interference graph as stated by Michael D. Smith and Glenn Holloway in an article entitled "Graph-Coloring Register Allocation for Architectures with Irregular Register Resources." This article is believed to have been submitted for publication to the ACM SIGPLAN 2002 Conference on Programming Language Design and Implementation, June 2002, and is incorporated by reference herein in its entirety.

FIGS. 1A and 1B illustrate the register allocator's view of general purpose register resources that are available in the well known x86 instruction set architecture. A resource array having 10 elements is used for the x86 general purpose register file. This resource array is shown in FIG. 1A by a bit vector 101. Each square of the array represents an allocable register resource. The shaded squares in FIG. 1A indicate resources consumed by a particular register name.

As shown in FIG. 1A, register AX consumes the same resources as the two individual registers AL and AH. Specifically, the first two elements of the bit vector (collectively labeled as 112 in FIG. 1A) that are consumed by register AX are same as two elements that are individually consumed by registers AL and AH (labeled as 111A and 111B). Moreover, register EAX is represented by these same two elements of the bit vector (which are labeled as 113), because the upper half of EAX is inaccessible.

Bit vector 101 forms a component of a register class data structure that is used by the register allocator. The register class data structure includes, in addition to bit vector 101, a resource mask 121 (to indicate which hardware resources are available to candidates of a class), weights 122, placements 123, and the following lists of register names:

Ca: {AX, EAX, BX, EBX, CX, ECX, DX, EDX}
Cb: {AL, AH, BL, BH, CL, CH, DL, DH}
Ci: {DI, EDI, SI, ESI}
Cm: {AX, EAX, BX, EBX, CX, ECX, DX, EDX, DI, EDI, SI, ESI}

Class Ca represents the 16- and 32 bit variants of the A, B, C and D registers, and Class Cb represents the nameable 8 bit portions of these registers; class Ci represents 16 bit and 32 bit variants of Di and Si; and Class Cm is a multi-bank register class comprising candidates from Ca and Ci. Class Ci is assigned to all weighted interference graph (WIG) nodes representing registers DI and SI, and class Cm is used for all other 16/32 bit candidates.

The above name lists are used when allocating colors. When a candidate 'n' is popped from the stack, the register allocator visits each neighbor of n in the WIG and builds a list of used (unavailable)(colors. The register allocator determines the resources used by each neighbor by use of bit vector 101. It then intersects a vector of unavailable colors against the hardware resources used by each of the register names in n's class. If the intersection is the empty bit vector, that register name is an available color for n. In the case of registers AX and EAX, the actual register name returned is the one whose bit size matches the bit size of the register candidate.

SUMMARY

Colors in accordance with the invention are arranged in prioritized order, to form a number of sequences. Each sequence is associated with one or more attributes (e.g. size and/or type) of variables whose nodes in an interference graph can be colored by colors in the sequence. In an example, there are a total of three groups, a first group to hold colors suitable for 8 bit variables, a second group to hold colors suitable for 16 bit variables, and a third group to hold colors suitable for variables that are pointers to memory.

In addition to the above-described grouping, colors within a group are arranged in prioritized order to form a sequence. The specific prioritization that is used may depend on, for example, an attribute (such as size) and also on a predetermined preference. One example of such a predetermined preference is that colors that represents registers of smaller size are to be prioritized before colors that represent registers of bigger size (e.g. colors are prioritized in ascending order, based on the size of registers that they represent).

Use of different groups of colors for variables of different sizes and/or different semantics ensures that colors being used are appropriate for the node being colored. Moreover, ordering of colors within a group ensures that a user's preference is implemented by the register allocator, for example to improve the likelihood that each variable of a program has a register allocated to it (i.e. register allocation is completed without spillage).

DETAILED DESCRIPTION

Figures 1A, 1B:
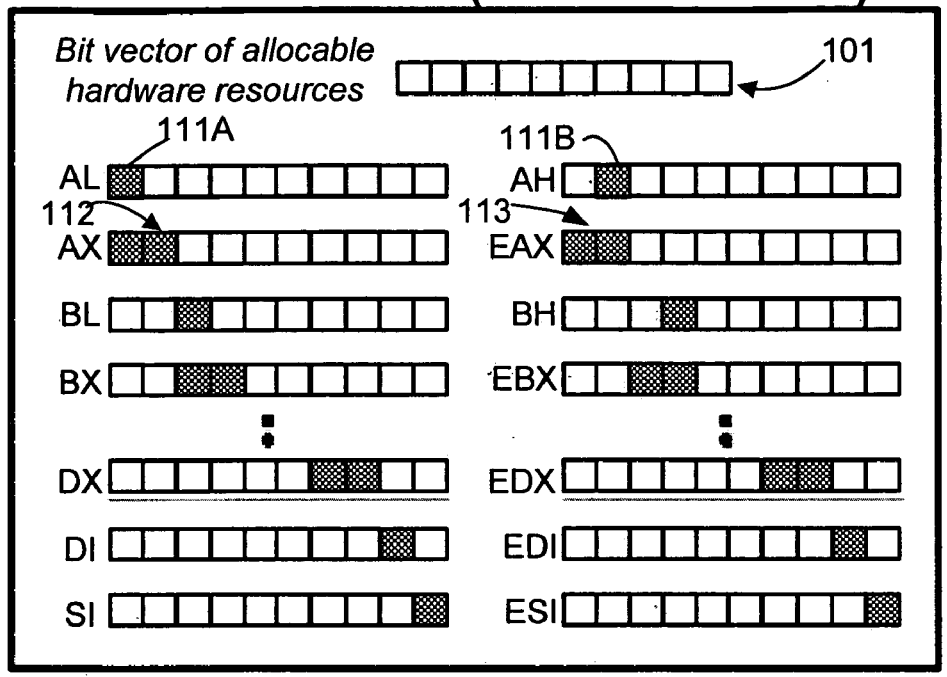
FIGS. 1A and 1B illustrate certain features of the prior art as described by Smith and Holloway.
Figure 2A:
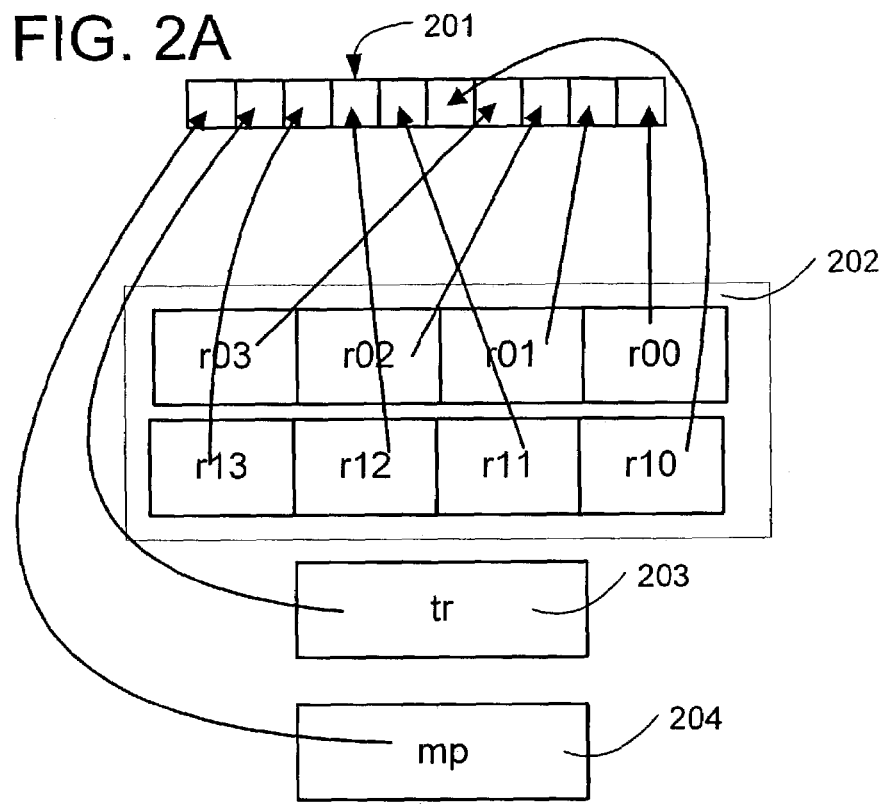
FIGS. 2A and 2B illustrate, in a conceptual drawing and in a flow chart respectively, definition of colors to be used in register allocation in accordance with the invention.
Figure 2B:
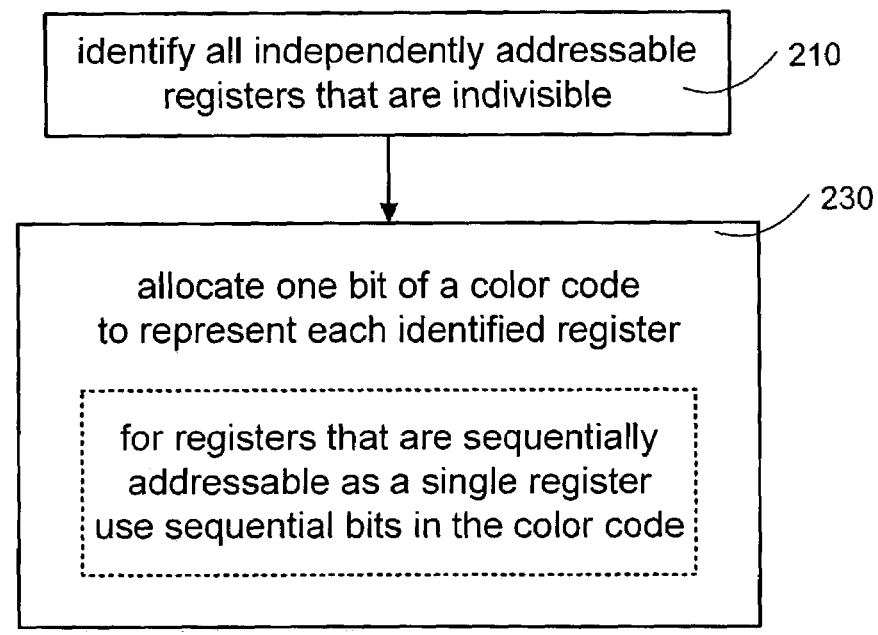

Initially, before performing any act related to register allocation, it is necessary first to identify all independently addressable registers that are indivisible (as per act 210 in FIG. 2B). The number of such registers determines the size of a color code that is used to represent colors. Specifically, the color code must be selected to be wide enough to contain one bit for each independently addressable register that is indivisible.

One example (illustrated in FIG. 2A) of a processor has a register file 202 with two rows, each row containing four 8 bit registers labeled r00, r01, r02 r03 in one row and r10, r11, r12 and r13 in another row. In the register file 202, any pair of adjacent registers (e.g. r01r02, or r02r03) may be used as a single register. In addition, this example also has two 16 bit registers 203 and 204 that are task register tr and memory pointer register mp. In this example, task register tr is used as a general purpose register (just like registers in the register file) by a task that executes the just-described program, and the memory pointer register mp is normally used to hold a pointer to memory (e.g. a memory address). In this example, there are eight registers in register file 202 and two additional registers 203 and 204. Therefore, the width of a color code 201 is chosen to be 10 bits wide.

After the width of the color code 201 is determined, it becomes necessary to allocate one bit of the color code to each register identified in act 230. As shown by act 230 in FIG. 2C, the following associations are made:

bit 0 with r00
bit 1 with r01
bit 2 with r02
bit 3 with r03
bit 4 with r10
bit 5 with r11
bit 6 with r12
bit 7 with r13
bit 8 with tr
bit 9 with mp In allocating bits of the color code, bits that are sequential are allocated to registers that are (a) sequentially located and (b) addressable as a single register. In the example illustrated in FIG. 2A, any pair of adjacent registers may be used as a single register. Therefore, a complete set of all colors includes:

SET OF ALL COLORS (in binary notation)
r00—0000000001
r01—0000000010
r02—0000000100
r03—0000001000
r10—0000010000
r11—0000100000
r12—0001000000
r13—0010000000
r00&r01—0000000011
r01&r02—0000000110
r02&r03—0000001100
r10&r11—0000110000
r11&r12—0001100000
r12&r13—0011000000
tr—0100000000
mp—1000000000

Figure 3A:
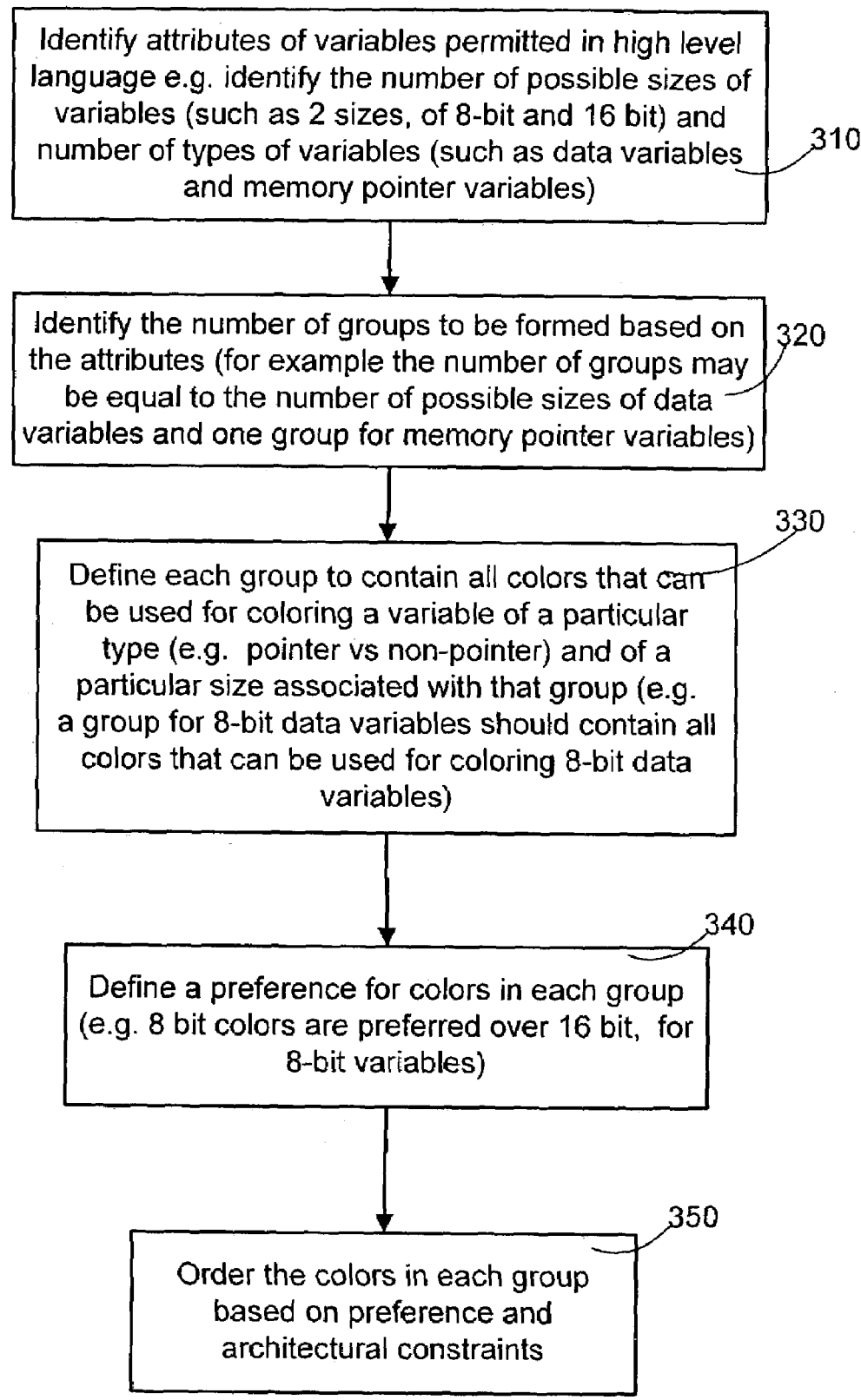
FIG. 3A illustrates, in a high-level flow chart, acts performed in some embodiments of the invention to generate sequences of colors.

These colors may be grouped in conformance with their likely usage, as illustrated in FIG. 3A. For example, in an act 310, a user identifies the number of possible sizes of variables of each type (e.g. data variables and memory pointer variables) in the high level language in which the software program is written.

In the example illustrated in FIG. 2A, variables in the high level language may have only one of two sizes: 8 bit and 16 bit (i.e. 32 bit variables are not permitted in this example). For this reason, in the next act 320, in the example of FIG. 2C, the user identifies three groups: a first group for 8 bit general purpose variables, a second group for 16 bit general purpose variables, and a third group for variables that hold memory pointers. Note that the general purpose variables are also called data variables in this description.

Next, in act 330, the user defines each group to contain all colors that can be used for coloring a variable of a particular type and particular size (e.g. a group for 8 bit data variables should contain all colors that can be used for coloring 8 bit data variables, and a group for 16 bit data variables should contain all colors that can be used for coloring 16 bit data variables).

In the example illustrated in FIG. 2A, the user identifies the following group of colors for coloring 8 bit data variables:
r00—0000000001
r01—0000000010
r02—0000000100
r03—0000001000
r10—0000010000
r11—0000100000
r12—0001000000
r13—0010000000
tr—0100000000

Note that even though register 'tr' is 16 bits wide, it is included in this group, because if necessary this register 'tr' can be allocated to an 8 bit data variable in the software program. For example, a program may contain only 8 bit data variables in which case register 'tr' should be used for an 8 bit data variable (instead of spilling or generating an error message).

Even though register 'mp' is 16 bits wide it is not included in the above group, because in the just-described example, this register is reserved (in some embodiments) for holding memory addresses only. If any program does not have a single variable that is a pointer, in such a program the register 'mp' remains unused. Since register 'tr' and the register file cannot be used to access memory (if a memory address is loaded therein), register 'mp' is reserved for holding such memory addresses. In other embodiments, register 'mp' may be used for data as well as memory addresses (i.e. regardless of semantics).

In the above-described example, any two adjacent 8 bit registers may be addressed as a single 16 bit register. Therefore, the user defines a second group of colors as being 16 bit colors:
r00&r01—0000000011
r01&r02—0000000110
r02&r03—0000001100
r10&r11—0000110000
r11&r12—0001100000
r12&r13—0011000000
tr—0100000000

As per act 330, the user defines each group to contain all colors that can be used for coloring a variable of a particular type (e.g. pointer vs non-pointer) and of a particular size associated with that group. For this reason in the above example, the user identifies all colors that can be used for coloring 8-bit data variables and all colors that can be used for coloring 16-bit data variables.

Also in act 330, the user defines a third group, to contain all colors that can be used for coloring variables that contain pointers to memory. The third group in this example has only one element:
mp—1000000000

Next, in act 340, the user identifies a preference for ordering of colors in each group. For example, in act 340, the user may decide that when ordering colors for 8 bit variables, the colors corresponding to 8 bit registers are to be located at the beginning of a sequence, and colors corresponding to indivisible 16 bit registers are to be located later in the sequence. The word 'indivisible' is used to indicate that a smaller portion of the register cannot be individually addressed, e.g. the upper 8 bits and lower 8 bits of an indivisible 16 bit register cannot be individually accessed (i.e. by just addressing).

The above-described user preference is advantageous in architectures in which 16 bit registers can be used for holding 16 bit variables as well as 8 bit variables. Therefore, the user may decide that he/she doesn't want 16 bit registers to be allocated to 8 bit variables, if there are 8 bit registers currently available for allocation.

Thereafter, in act 350, colors within each group are arranged by the user in a particular order, based on the preference identified in act 340. For the above-described example, the following table I shows a sequence of colors to be used in allocating registers to 8 bit variables:

TABLE I

| SEQUENCE NUMBER | REGISTER | COLOR |
| --- | --- | --- |
| 1 | r00 | 0000000001 |
| 2 | r01 | 0000000010 |
| 3 | r02 | 0000000100 |
| 4 | r03 | 0000001000 |
| 5 | r10 | 0000010000 |
| 6 | r11 | 0000100000 |
| 7 | r12 | 0001000000 |
| 8 | r13 | 0010000000 |
| 9 | tr | 0100000000 |

In the above exemplary sequence of nine colors for 8 bit variables, all the eight colors representing 8 bit registers are located ahead of a single color that represents the 16 bit register. If instead of a single task register tr, in another architecture there were multiple 16 bit task registers, the colors corresponding to these multiple task registers would be located at the end of the sequence (i.e. after all the 8 bit colors).

In the above-described act 340, the user may decide on another preference for 16 bit variables: colors corresponding to indivisible 16 bit registers are placed at the beginning of a sequence, followed by colors for pairs of adjacent 8 bit registers that can also be used for holding 16 bit values. The just-described preference is advantageous in architectures in which two adjacent 8 bit registers can be addressed as a pair (so that each pair of 8 bit registers can be used to hold a single 16 bit variable).

In deciding on the just-described preference, the user treats 8 bit register pairs as being more valuable (and hence ordered later in the sequence) because they can hold two types of variables: a single 16 bit variable or two 8 bit variables, i.e. these two adjacent 8 bit registers can be used in more than one way. Therefore, the user prioritizes use of less flexible 16 bit registers at the beginning of the color sequence for 16 bit variables followed later by colors for pairs of 8 bit registers.

The following table II shows a sequence of colors to be used in allocating registers to 16 bit variables in the above-described example:

TABLE II

| SEQUENCE NUMBER | REGISTER | COLOR |
| --- | --- | --- |
| 1 | tr | 0100000000 |
| 2 | r00&r01 | 0000000011 |
| 3 | r01&r02 | 0000000110 |
| 4 | r02&r03 | 0000001100 |
| 5 | r10&r11 | 0000110000 |
| 6 | r11&r12 | 0001100000 |
| 7 | r12&r13 | 0011000000 |

Figure 4A:
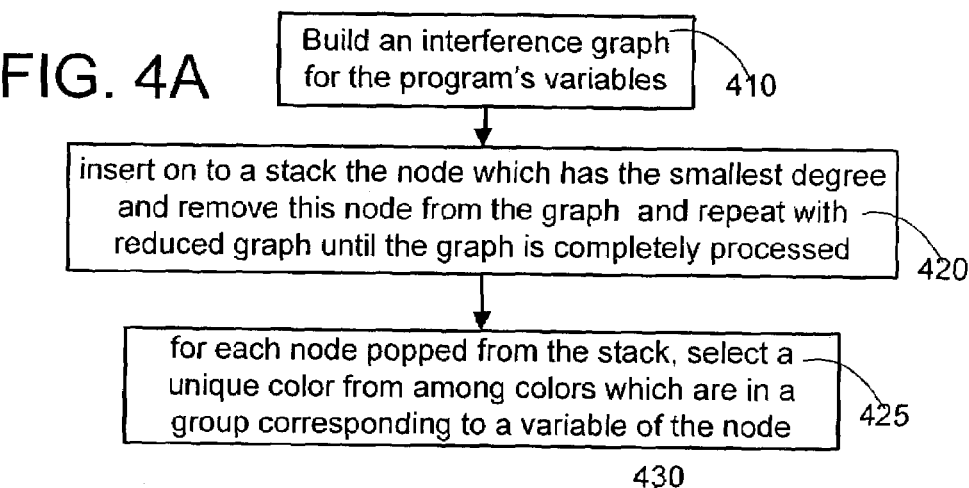
FIG. 4A illustrates, in a high-level flow chart, use of color sequences in register allocation in accordance with the invention.
Figure 4B:
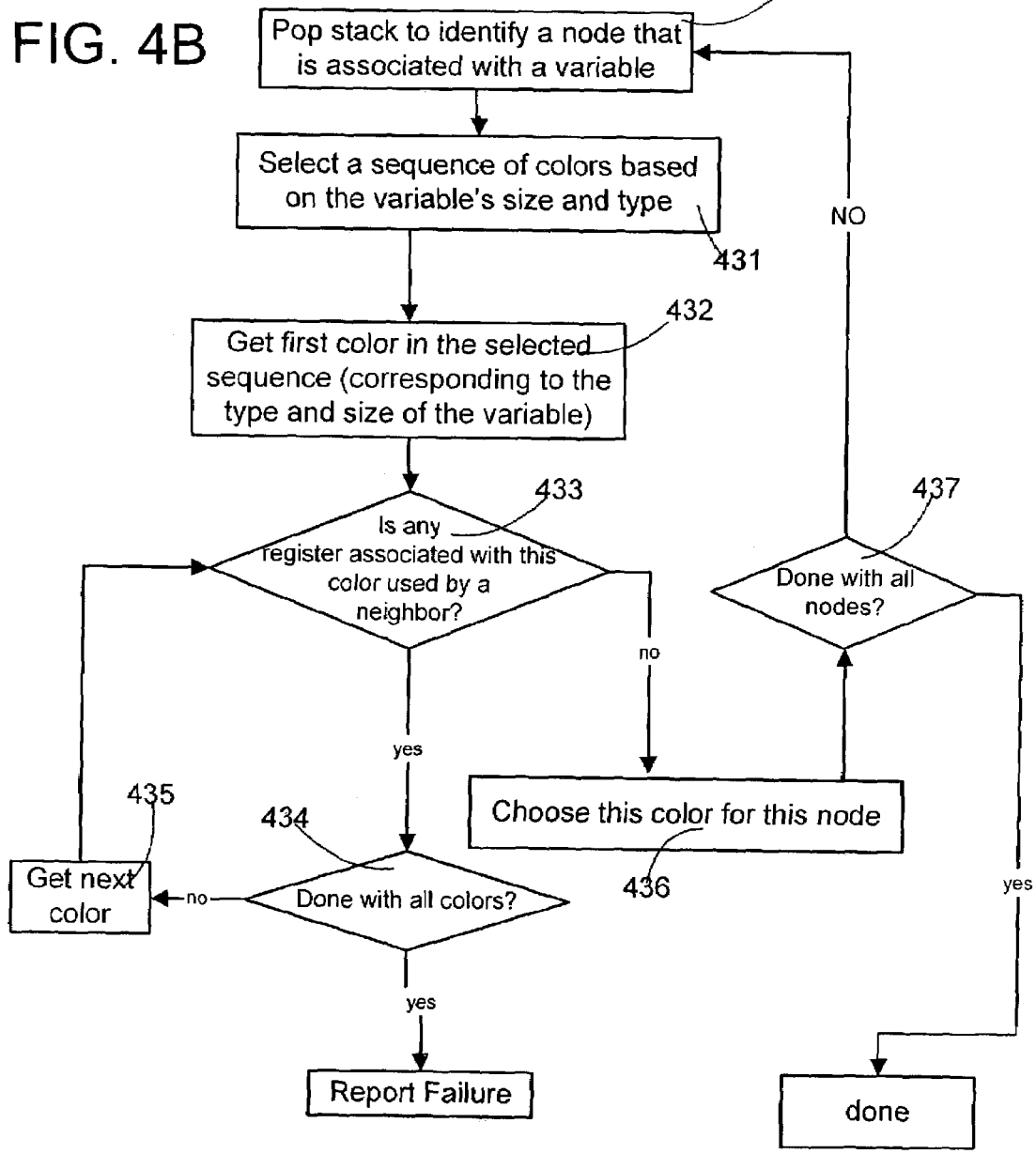
FIG. 4B illustrates, in an intermediate-level flow chart, acts performed to select a unique color depending on a variable's size in certain embodiments of the invention.

Such ordered sequences of colors are used during register allocation as discussed below in reference to FIGS. 4A and 4B.

Referring to act 330 in FIG. 3A, one specific implementation thereof is illustrated by the acts in FIG. 3B as discussed next. Specifically, a user gets a color (as per act 331), and a group (as per act 332). For example, the user may select a first color 0000000001, and a first group for 8 bit variables. Next, the computer checks if this color can be used to color a node for a variable of a size and semantics associated with this group (as per act 333). In the just-described example, the chosen color is for register r00 which can hold an 8 bit variable, and therefore the answer is yes.

If the answer is yes in act 333, the user adds this color to this group (as per act 334). Thereafter, in act 335, the user checks if all groups have been processed, and if not gets the next group (in act 336) and returns to act 333 (described above). In the example, the user gets a 16 bit group and returns to act 333. In this iteration for this example, the answer in act 333 is no and therefore the user goes directly to act 335 (i.e. the color for register r00 is not added to the 16 bit group). In act 335 if all groups have been processed, then the user goes to act 337 to check if all colors have been processed, and if not goes to act 338 to get the next color and then returns to act 332.

Figure 2C:
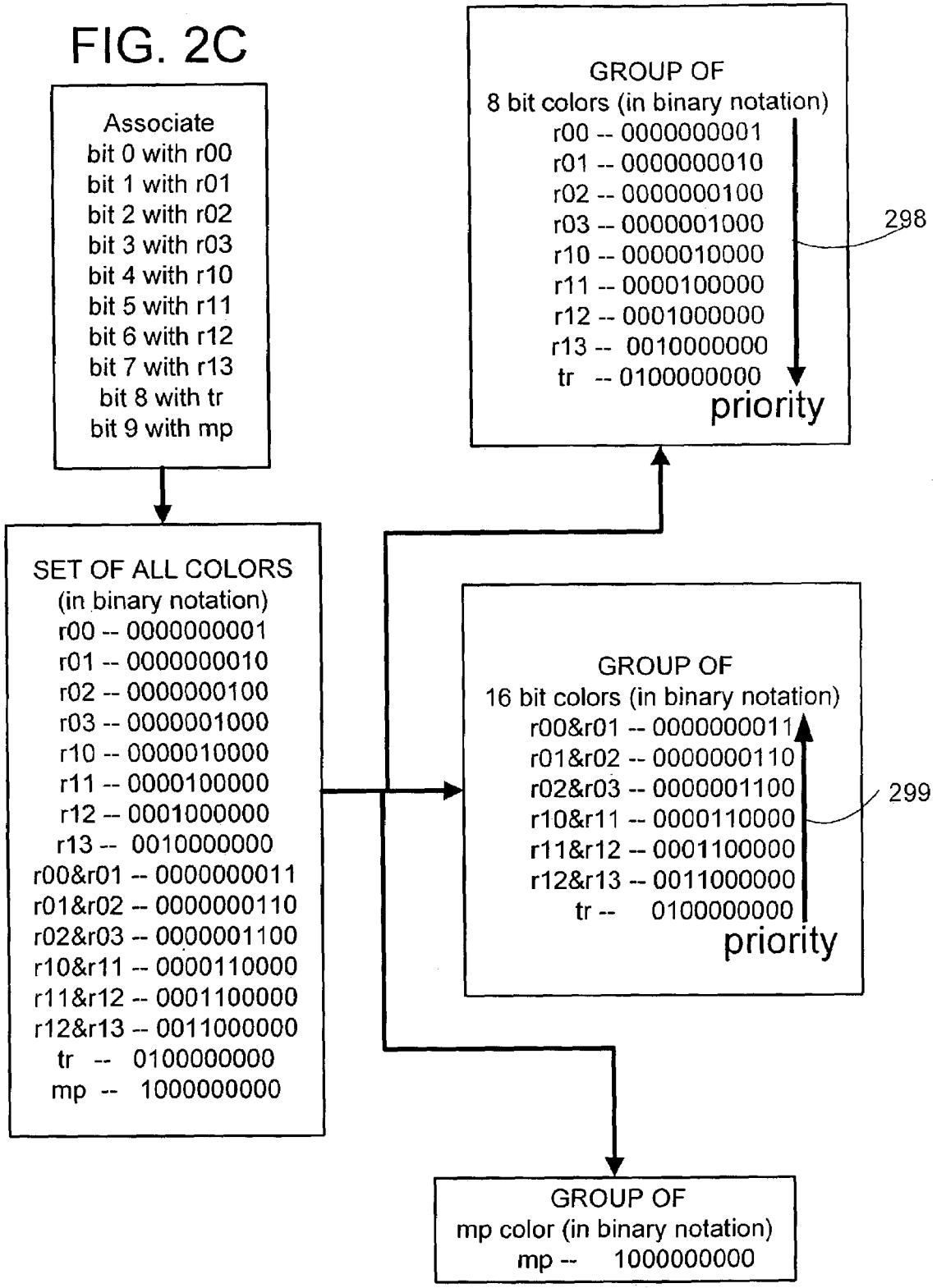
FIG. 2C illustrates, in a conceptual drawing, creation of colors to be used in register allocation in accordance with the invention.
Figure 3B:
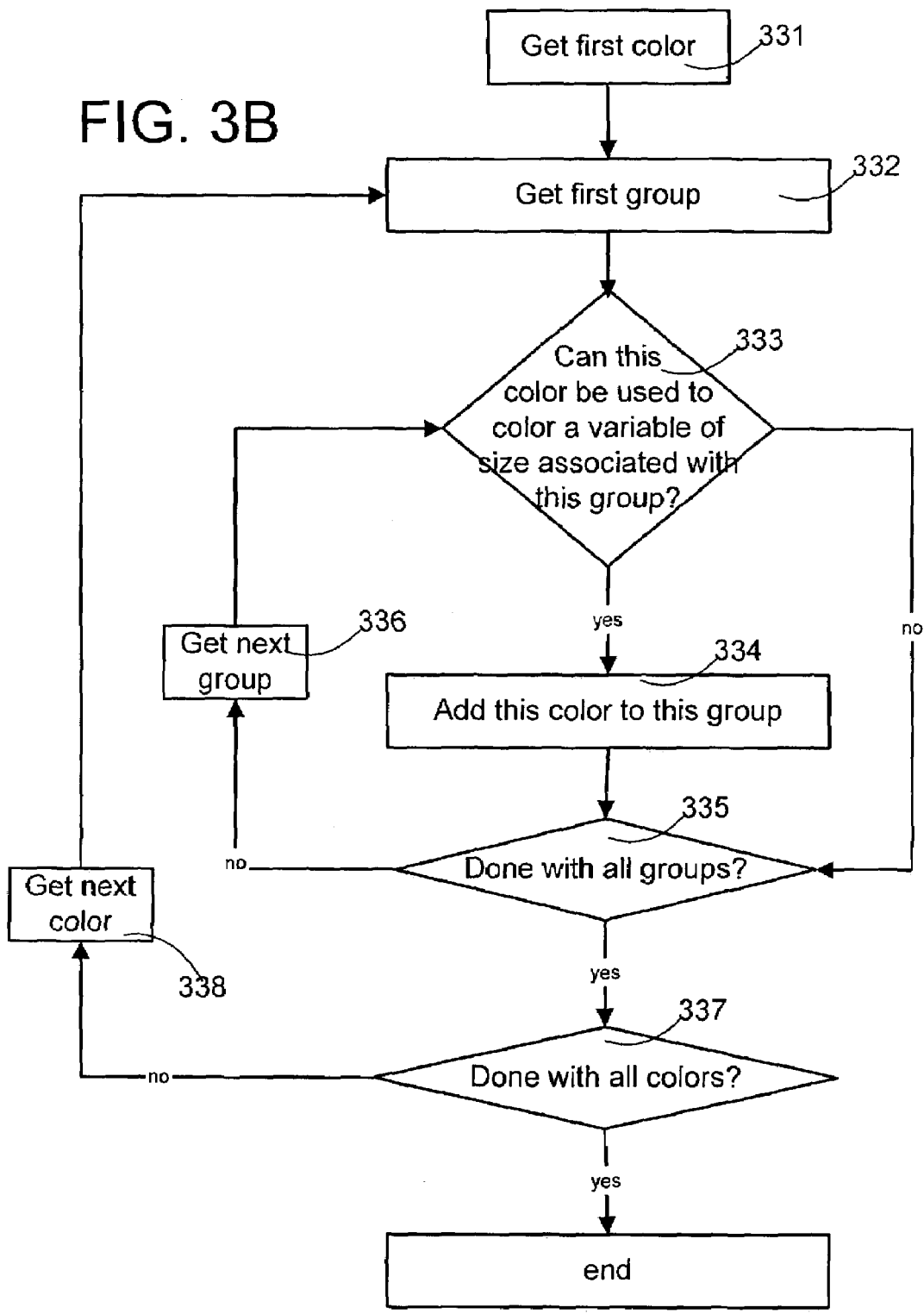
FIG. 3B illustrates, in an intermediate-level flow chart, acts performed to define groups of colors as per act 330 in FIG. 3A.

The above-described acts of FIG. 3B identify the colors that are to be present in each group, and as noted above these colors are arranged in a particular order (and this may be done manually) in accordance with architectural constraints. Such prioritization of the colors within each group results in a sequence of colors as shown in act 350 (FIG. 3A). These sequences of colors are used later during register allocation, as illustrated in FIG. 4A and described next. The specific manner in which colors are prioritized is illustrated in FIG. 2C by arrows 298 and 299, and also illustrated below in another example.

Register allocation using sequences of colors is performed by taking into account the prioritization of colors specified in each sequence. Referring to FIG. 4A, in an act 410, an interference graph is built in the normal manner, as described by, for example, Chaitin and/or Briggs. Next, in act 420, a node that has the smallest number of neighbors (also called "degree") is removed (together with all edges connected to it) from the graph (i.e. the graph is pruned) and this removed node is placed on a stack. Then this act is repeated with the pruned graph, until the graph is completely processed. Then, as per act 425 the nodes in the stack are processed, by popping them one at a time and coloring them as described next in reference to FIG. 4B.

Specifically, for each node popped from the stack, as illustrated by act 430 (FIG. 4B), the register allocator takes the first color in the color sequence corresponding to the variable's size and type, and checks that a resource to be used by the selected color is not already used by any neighboring node. If so, the selected color is used for this node, else the register allocator selects and processes the next color in the sequence.

One specific implementation of a register allocator performs the acts illustrated in FIG. 4B as follows. Specifically, in act 430, the first node in the stack is popped and then a sequence is selected in act 431. The sequence may be selected based on a number of different attributes of the variable, such as type (whether memory pointer or data, whether signed or unsigned) and size. Therefore, in one embodiment, the variable's type and the variable's size are used as indices into a two-dimensional array. The two-dimensional array contains sequences to be used in identifying a color for variables with different attributes.

Next, a first color in the selected sequence is taken in act 432. Note that for each variable, colors are selected one at a time from the beginning of the sequence, i.e. each color is identified in act 432 in a specific order in which the colors have been arranged in each sequence.

Then, in act 433, the register allocator checks if any register associated with this color is used by a neighboring node. If so, then this color cannot be used, and the register allocator goes to act 434 to check if there are any remaining colors in the appropriate sequence, and if so gets the next color as per act 435 and returns to act 433. If all colors have already been processed in act 434, the register allocator reports a failure.

In act 433, if the answer is no, then the register allocator goes to act 436 and allocates this color to the variable represented by this node. Next the register allocator goes to act 437 to check if there are any more nodes left in the stack, and if not then the register allocation has completed. If there are more nodes in the stack, the next node is popped from the stack as per act 430 and then the register allocator returns to act 431 (discussed above).

Numerous modifications and adaptations of the embodiments described herein will be apparent to the skilled artisan in view of the disclosure. For example, any register allocator well known in the art can be modified in the manner described herein to use colors that have been grouped based on one or more attributes of variables in the software program, and furthermore to process colors within each group in a specific order that has been chosen to implement a predetermined preference.

Several embodiments of the type described herein use graph coloring heuristics for register allocation, for choosing a color for the interference graph node. In such embodiments, there is a one to one correspondence between interference graph nodes and variables' webs. So in the following description these two terms are used interchangeably. Also, in such embodiments, there is a one to one correspondence between hardware resources and colors. So in the following description we will use these two terms interchangeably.

The term "web" of a variable is used herein as defined on page 486 in Chapter 16 of the book "Advanced Compiler Design and Implemetation" by Steven S. Muchnick, published by Morgan Kaufmann, Academic Press 1997. This chapter 16 is incorporated by reference herein in its entirety.

As used herein, a DU chain connects a definition of the variable with all uses of the variable that are reachable from the definition, in a control flow graph. Also, as used herein a "web" means a maximal union (i.e. largest union) of DU chains, such that for each definition D and use U of a variable, either U is in a DU chain of D, or there exists a sequence of definitions and uses of this variable namely D0, U0, . . . , Di, Ui, Di+1, Ui+1, . . . ,Dn, Un such that, D=D0 and U=Un and for each i, Ui is in the DU chains of both Di and Di+1.

In an example of two DU chains namely D1U1 and D2U1, these two chains share the same use U1, and if there are no other uses reachable from D1 or D2 and no other definitions from which U1 is reachable, then a set containing the three statements D1, U1 and D2 forms the maximal union of DU chains. Hence in this example, a web contains these three statements.

In some embodiments of the invention, all variables are partitioned into several groups in accordance to which resources can be allocated for this group of variables. For example if in hardware architecture we have 8 bit registers (called "R8 registers"), 16 bit registers (called "R16" registers), 32 bit registers (called "R32" registers) and registers that hold memory address during memory access (called "MADMA" registers), then the strategy could be that variables which are used like pointers in the program should be put into one of the MADMA registers, general purpose (those which are not used like pointers) 32 bit variables can be put into one of R32 registers, general purpose 16 bit variables can be put into one of R16 registers or one of R32 registers, and general purpose 8 bit variables can be put into any of R8, R16 or R32 registers.

So we get four groups which are distinguished by the variables' size and variables' use. In general other architectural constraints and/or high level language constructs may affect the creation of groups. As one can see the same resource can be associated with different groups. To make register allocation more optimal, we prioritize different colors associated with each group by ordering them. Such prioritization can be static wherein colors are ordered at the very beginning (i.e. the sequences are predetermined). Note however, that prioritization of colors for a group can alternatively be dynamic where the order in which resources are being checked for allocatability depends on either some properties of variable's web, or some properties of variable itself, or variable use or may be something else.

During resource search for a variable's web (or, in other words, during search for a color for interference graph node) we identify the group the variable belongs to and go through the set of resources associated with this group in accordance to priority method. For each resource we check if it can be allocated for this web. The first resource that provides positive answer to this checking is chosen for this web. In our example resources in the group for 8 bit variables should be ordered in the following way. First go R8 registers, after that R16 registers, and at the end R32 registers. The reason for that is that we do not want to use big registers for holding small variables, because we may need big registers for holding big variables. So for 8 bit variables we would prefer to use 8 bit registers if there are some available. Only in the case we have no 8 bit registers available we check 16 bit registers. And only if we have no 16 bit registers available either, we are checking 32 bit registers.

Let's assume that there only ability to assign 16 bit value to a register in one assembler instruction. Let's assume also that most significant 16 bit and least significant 16 bit of some of R32 registers can be referenced in assembler as a separate resources. Let's use RD32 to denote the set of such registers, and let RND32=R32\RD32 ("ND" stands for 'non-divisible' and "D" stands for 'divisible'). Then for 32 bit variables it would make sense to check RND32 register for allocatability first because RD32 registers could be used for storing two 16 bit variables also, so you do not want to waste such a flexible resource if there are less flexible (i.e. less valuable) resources currently available.

But if one of the definitions of the web is an assignment of an number bigger than 0xffff then it makes sense to check RD32 registers first because if RD32 register will be allocated for the web in question this assignment could be performed with two assembler instructions, while for register from RND32 you need more than that.

Note, that it may happen that for a sequence of colors for say a 16 bit data variable, the first color located at the beginning of the selected sequence represents a register of 16 bit size. In this same sequence, a last color located at the end of the selected sequence represents another register (e.g. 32 bit register) which is of a larger size than the variable size. Depending on the architecture, this preference may also be present in a sequence of colors for a 8 bit data variable. But note that a different preference may be present in a sequence for a 32 bit data variable (e.g. the register corresponding to the last color may be of the same size as the register corresponding to the first color).

Numerous such modifications and adaptations of the embodiments, examples and implementations described herein are encompassed by the attached claims.

The invention claimed is:

1. A method of creating a plurality of sequences of colors to be used in register allocation for a software program, the method comprising:
   identifying a plurality of sizes of variables allowed in a language of the software program;
   selecting a size in the plurality of sizes;
   identifying a number of colors that can be used for coloring a variable of the selected size;
   associating said colors with said size thereby to form a group;
   ordering the colors in said group in a sequence, based on a predetermined preference; and
   repeating said selecting, said identifying of number of colors, said associating and said ordering, for each size in the plurality of sizes other than said selected size.

2. The method of claim 1 further comprising:
   identifying a set of registers available for register allocation;
   identifying all combinations of registers in the set that can be allocated to variables of the selected size; and associating a color with each of the identified combinations of registers;

wherein each of the associated colors is included in the group of colors to be used for coloring variables of the selected size.

3. The method of claim 1 wherein the variables hold only data, and the method further comprises:

identifying an additional group of colors that can be used for coloring a variable that holds a pointer to memory.

4. A computer programmed to allocate registers to variables in a software program, the programmed computer comprising:

means for ordering webs of variables of the software program into a sequence (also called "web sequence");

means for identifying a web in sequential order from the web sequence;

memory encoded with a plurality of sequences of colors, each sequence containing colors that are arranged in a specific order based on a predetermined preference;

means coupled to said memory, for identifying a color from a sequence in said plurality of sequences, wherein each color is identified one at a time in said specific order within said sequence;

means for checking if a register, associated with the color identified by said means coupled to memory, is used by a neighbor of one of the variables in the web identified by the means for identifying; and means for using the identified color for coloring said one of the variables if the means for checking indicates that the register is not used.

5. The computer of claim 4 wherein:

each sequence of colors is associated with a predetermined size from among a plurality of sizes;

a first color located at the beginning of the selected sequence represents a register of the size associated with the selected sequence; and a last color located at the end of the selected sequence represents another register of a larger size than the size associated with the selected sequence.

6. The computer of claim 4 wherein:

each sequence of colors is identified as being suitable for a specific type.

7. A method of creating a plurality of sequences of colors to be used in register allocation for a software program, the method comprising:

identifying a plurality of attributes of variables allowed in a language of the software program;

selecting an attribute in the plurality of attributes;

identifying a number of colors that can be used for coloring a variable of the selected attribute;

associating said colors with said attribute thereby to form a group; ordering the colors in said group in a sequence, based on a predetermined preference; and repeating said selecting, said identifying of number of colors, said associating and said ordering for each attribute in the plurality of attributes other than said selected attribute.

8. The method of claim 7 wherein:

the attribute indicates whether the variable holds data or a pointer.

9. The method of claim 7 wherein:

the attribute indicates a size of the variable.

* * * * *